United States Patent
Jung et al.

(10) Patent No.: US 7,768,719 B2
(45) Date of Patent: Aug. 3, 2010

(54) SUPER WIDE ANGLE OPTICAL SYSTEM

(75) Inventors: Phil Ho Jung, Gyunggi-do (KR); Moon Do Yi, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 141 days.

(21) Appl. No.: 12/076,016

(22) Filed: Mar. 12, 2008

(65) Prior Publication Data
US 2009/0073577 A1    Mar. 19, 2009

(30) Foreign Application Priority Data

Sep. 19, 2007    (KR) .................. 10-2007-0095523

(51) Int. Cl.
G02B 9/62    (2006.01)
G02B 13/18    (2006.01)
(52) U.S. Cl. .................... 359/762; 359/713
(58) Field of Classification Search ............... 359/793, 359/781–784, 725, 668
See application file for complete search history.

(56) References Cited

U.S. PATENT DOCUMENTS 3,658,410 A    4/1972   Willey
7,151,596 B2 *  12/2006  Takahashi et al. ............ 356/138
7,457,044 B2 *  11/2008  Ohzawa et al. ............... 359/671

FOREIGN PATENT DOCUMENTS

JP    2006-11093    1/2006
KR   10-2002-0083785    11/2002

OTHER PUBLICATIONS

German Office Action issued on Mar. 25, 2009 in corresponding German Patent Application 10 2008 013 165.2.
English translation of Korean Office Action issued Apr. 22, 2009 in corresponding Korean Patent Application 10-2007-0095523.

* cited by examiner

Primary Examiner—Jordan M. Schwartz

(57) ABSTRACT

A super wide angle optical system including: a first lens group including one or more of irrotational symmetric lens surfaces disposed sequentially from an object side and having, overall, a negative refractive power; an aperture stop for intercepting unnecessary light; and a second lens group including one or more of irrotational symmetric lens surfaces and having, overall, a positive refractive power.

8 Claims, 6 Drawing Sheets

SUPER WIDE ANGLE OPTICAL SYSTEM

CROSS-REFERENCE TO RELATED APPLICATIONS

This application claims the priority of Korean Patent Application No. 2007-0095523 filed on Sep. 19, 2007, in the Korean Intellectual Property Office, the disclosure of which is incorporated herein by reference.

BACKGROUND OF THE INVENTION

1. Field of the Invention

The present invention relates to a super wide angle optical system, and more particularly, to a super wide angel optical system having a wider viewing angle in a certain direction, embodying subminiaturization, and manufactured at a low price.

2. Description of the Related Art

In general, in optical systems employed in a camera for automobile or a monitoring camera, to take an image of a wider range of the front, side, and rear, there are simultaneously required a wide angle lens having a horizontal viewing angle more than a certain degree and a lens with a subminiaturized size and light weight, which is employed in the optical system.

Particularly, optical systems employed to a camera for automobile should be designed to have a viewing angle of approximately 90 degrees from the ground to the horizon in a vertical direction and have a relatively wider viewing angle in a horizontal direction than the viewing angle in the vertical direction to provide a full visual field.

Lenses forming a general optical system are a circular shape rotationally symmetrical to an optical axis, and light incident on such optical system is also circular. Accordingly, when an optical system employing a wide angle lens rotationally symmetric is mounted on a camera, a lot of images in an unnecessary area is shown, and simultaneously, an unnecessary image area occurs on an image plane of an image sensor.

Also, when an optical system having a wide viewing angle is formed of rotationally symmetric lenses, a length of the optical system in an optical axis is increased and a diameter of a lens should be increased to provide a peripheral light amount, which obstacles subminiaturization of the optical system.

SUMMARY OF THE INVENTION

An aspect of the present invention provides a super wide angle optical system capable of realizing subminiaturization and providing a wider viewing angle in a horizontal direction than that in a vertical direction while reducing manufacturing costs.

According to an aspect of the present invention, there is provided a super wide angle optical system including: a first lens group including one or more of irrotational symmetric lens surfaces disposed sequentially from an object side and having, overall, a negative refractive power; an aperture stop for intercepting unnecessary light; and a second lens group including one or more of irrotational symmetric lens surfaces and having, overall, a positive refractive power.

The first lens group may include: a first lens including an object-side surface convex to the object side and an image-side surface concave to an image side and having a negative refractive power; a second lens including an object-side surface and an image-side surface formed of irrotational symmetric lens surfaces and having a negative refractive power; and a third lens including an object-side surface convex to the object side and having a positive refractive power. The second lens group may include: a fourth lens including an object-side surface convex to the object-side and an image-side surface convex to the image side and having a positive refractive power; a fifth lens including an object-side surface concave to the image side and an image-side surface concave to the object side and having a negative refractive power; and a sixth lens including an object-side surface and an image-side surface formed of irrotational symmetric lens surfaces and having a positive refractive power.

Two or more lenses of the first and second lens groups may include one or more of surfaces formed of an aspheric plastic material.

The first lens group and the second lens group may be provided where a viewing angle between a long axis and an image plane is 130 degree or more.

Following Conditional expression 1 may be satisfied. $1.5 < FOVX/FOVY < 2.0$ .... Conditional expression (1) in which FOVX indicates a viewing angle of a long axis and FOXY indicates a viewing angle of a short axis.

Following Conditional expression 2 may be satisfied. $1.0 < EFY/EFX < 1.5$ .... Conditional expression (2) in which EFY indicates an effective focal length of the short axis and EFX indicates an effective focal length of the long axis.

Following Conditional expression 3 may be satisfied. $7.0 < r1/EFX < 11.0$ .... Conditional expression (3) in which r1 indicates a curvature radius of the object-side surface of the first lens.

Following Conditional expression 4 may be satisfied. $-4.2 < L/2w < 5.5$ .... Conditional expression (4) in which L indicates a length from a definite point on the object-side surface of the first lens to the image plane and 2W indicates the viewing angle of the long axis [radian].

Following Conditional expression 5 may be satisfied. $-7.5 < L/Fno < 8.5$ .... Conditional expression (5) in which Fno indicates an F-number of the optical system.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1A:
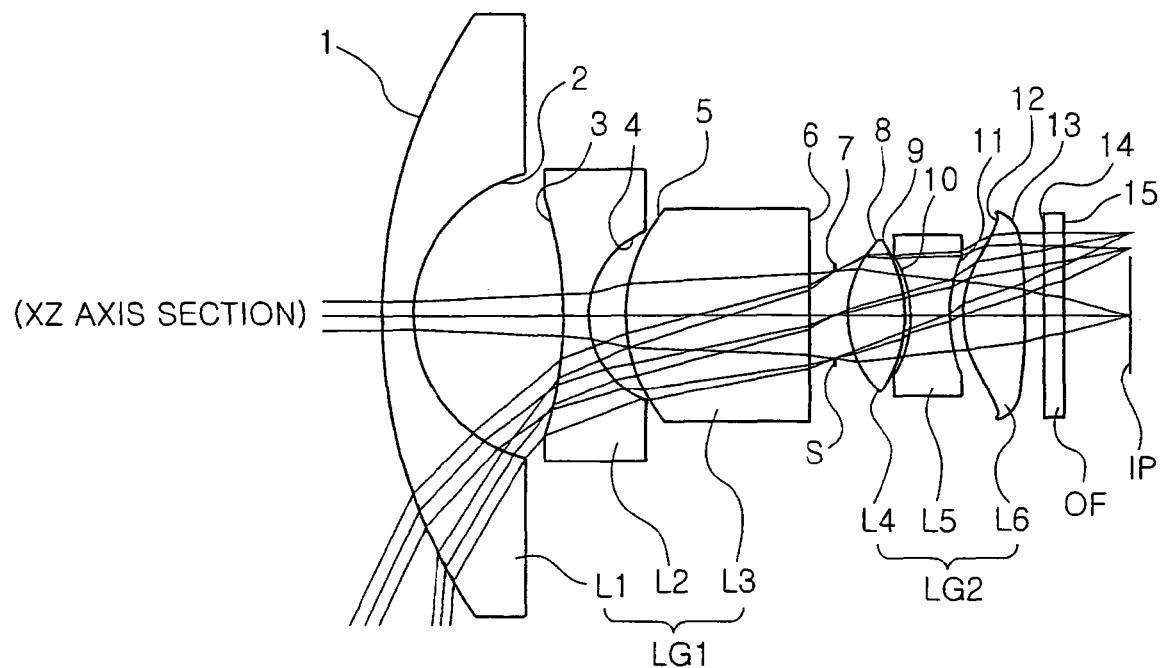
FIG. 1A is a vertical cross-sectional view illustrating a lens configuration of a super wide angle optical system according to an embodiment of the present invention, which is vertically cut from an XZ plane passing through Z-axis in a cubic basic coordinate system.
Figure 1B:
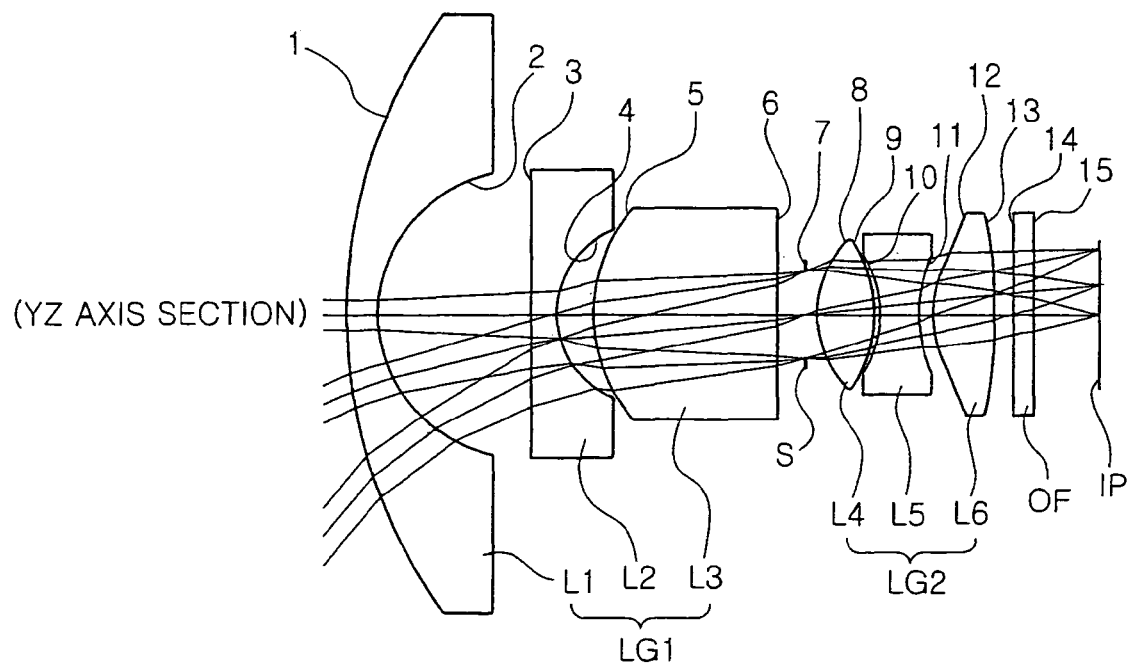
FIG. 1B is a vertical cross-sectional view illustrating the lens configuration of the super wide angle optical system of FIG. 1A, which is vertically cut from a YZ plane passing through Z-axis in the cubic basic coordinate system.

FIG. 1A is a vertical cross-sectional view illustrating a lens configuration of a super wide angle optical system according to an embodiment of the present invention, which is vertically cut from an XZ plane passing through Z-axis in a cubic basic coordinate system, and FIG. 1B is a vertical cross-sectional view illustrating the lens configuration of the super wide angle optical system of FIG. 1A, which is vertically cut from a YZ plane passing through Z-axis in the cubic basic coordinate system.

In the drawings, a thickness, a size, and a shape of a lens are little exaggerated for description. Particularly, a spherical shape or an aspherical shape shown in the drawings is just an example and the present invention is not limited thereto.

As shown in FIG. 1, the optical system includes a first group LG1, an aperture stop S, and a second lens group LG2, disposed sequentially from an object side.

The first lens group LG1 has, overall, a negative refractive power and includes one irrotational symmetric lens surface. The first lens group LG1 includes a first lens L1, a second lens L2, and a third lens L3.

The first lens L1 has a negative refractive power and includes an object-side surface 1 convex to the object side and an image-side surface 2 concave to an image side. The second lens L2 has a negative refractive power and includes an object-side surface 3 and an image-side surface 4 formed of irrotational symmetric lens surfaces. The third lens L3 has a positive refractive power and includes an object-side surface 5 convex to the object side.

The second lens group LG2 has, overall, a positive refractive power and includes one or more of irrotational symmetric lens surfaces. The second lens group LG2 includes a fourth lens L4, a fifth lens L5, and a sixth lens L6.

The fourth lens L4 has a positive refractive power and includes an object-side surface 8 convex to the object side and an image-side surface 9 convex to the image side. The fifth lens L5 has a negative refractive power and includes an object-side surface 10 concave to the image side and an image-side surface 11 concave to the object side, formed of aspheric lenses. The sixth lens L6 has a positive refractive power and includes an object-side surface 12 and an image-side surface 13 formed of irrotational symmetric lenses.

Between the first lens group LG1 and the second lens group LG2, the aperture stop for removing unnecessary light is disposed.

In the back of the second lens group LG2, an optical filter OF including an infrared filter and a cover glass is provided. It is possible to replace the infrared filter and the cover glass by another filter or omitted whenever necessary, and there is no influence on optical features of the present invention in principle.

Also, an image sensor is formed of a charged coupled device (CCD) or a complementary metal oxide semiconductor (COMS) and disposed in the back of the optical filter OF, corresponding to an image plane IP, which is a photosensitive surface, receiving an image formed by lenses.

The second lens L2 and sixth lens L6 including the object-side surfaces 3 and 12 and the image-side surfaces 4 and 13 formed of irrotational symmetric lenses according to exemplary embodiments of the present invention may be formed of, but not limited to, a resin material such as plastic. The object-side surface 10 and the image-side surface 11 of the fifth lens L5 according to exemplary embodiments of the present invention may be formed of, but not limited to, aspherical surfaces.

The first lens L1 has a negative optical power and refracts light greatly. The second lens L2 refracts the light refracted by the first lens L1 more by a negative optical power, and simultaneously, changes a ratio between a length of X-axis, a long axis, and a length of Y-axis, a short axis, of the light reaching the image plane IP to widen a viewing angle in a long axis direction.

The third lens L3 corrects astigmatism. The fourth lens L4 has a positive optical power. The fifth lens L5 has a negative optical power. The sixth lens L6 corrects irrotational symmetric aberration elements occurring in the second lens L2.

Effects of following Conditional expressions 1 to 5 in the described configuration will be described.

$1.5 < FOVX/FOVY < 2.0$  Conditional expression (1)

in which FOVX indicates a viewing angle of a long axis, a vertical viewing angle, and FOXY indicates a viewing angle of a short axis, a horizontal viewing angle.

Conditional Expression 1 relates to a ratio between the vertical viewing angle and the horizontal viewing angle. When out of a lower limit, there is shown an unnecessary image on the image plane IP. When out of an upper limit, an irrotational symmetric lens is added to be used, thereby increasing manufacturing costs.

$1.0 < EFY/EFX < 1.5$  Conditional expression (2)

in which EFY indicates an effective focal length of the short axis, a vertical effective focal length, and EFX indicates an effective focal length of the long axis, a horizontal effective focal length.

Conditional Expression 2 relates to a ratio between the vertical viewing angle and the horizontal viewing angle. When out of a lower limit, there is shown an unnecessary image on the image plane IP. When out of an upper limit, an irrotational symmetric lens is added to be used, thereby increasing manufacturing costs.

$7.0 < r1/EFX < 11.0$  Conditional expression (3)

in which r1 indicates a curvature radius of the object-side surface 1 of the first lens L1.

Conditional Expression 3 relates to aberration correction. When out of a lower limit, since it is uneasy to manufacture the first lens L1, it is difficult to correct a spherical aberration. When out of an upper limit, it is difficult to embody a desired optical angle.

$-4.2 < L/2w < 5.5$  Conditional expression (4)

in which L indicates a length from a definite point on the object-side surface 1 of the first lens L1 to the image plane IP and 2W indicates the viewing angle of the long axis [radian].

Conditional Expression 4 relates to embodying a wide angle and subminiaturization. When out of a lower limit, an overall length of the optical system is decreased, thereby deteriorating optical properties. When out of an upper limit, the length of the optical system is increased.

$-7.5 < L/Fno < 8.5$  Conditional expression (5)

in which Fno indicates an F-number of the optical system.

Conditional Expression 5 relates to brightness and subminiaturization of the optical system. When out of a lower limit, the brightness of the optical system becomes relatively dark to be disadvantageous to a light source with low luminescence. When out of an upper limit, the overall length of the optical system is increased.

Hereinafter, exemplary embodiments of the present invention will be described in detail.

As described above, in the exemplary embodiments, the first lens group LG1 has, overall, a negative refractive power and includes the first lens L1 having a negative refractive power and including the object-side surface 1 convex to the object side and the image-side surface 2 concave to an image side, the second lens L2 having a negative refractive power and including the object-side surface 3 and the image-side surface 4 formed of irrotational symmetric lens surfaces, and the third lens L3 having a positive refractive power and including the object-side surface 5 convex to the object side. Also, the second lens group LG2 has, overall, a positive refractive power and includes the fourth lens L4 having a positive refractive power and including the object-side surface 8 convex to the object side and the image-side surface 9 convex to the image side, the fifth lens L5 having a negative refractive power and including the object-side surface 10 and the image-side surface 11 formed of aspheric lenses, and the sixth lens L6 having a positive refractive power and including the object-side surface 12 and the image-side surface 13 formed of irrotational symmetric lenses.

Between the first lens group LG1 and the second lens group LG2, there is disposed the aperture stop for controlling a light amount and removing unnecessary light. Also, the image sensor senses light incident from the sixth lens L6 and is corresponding to the image plane IP.

Also, between the sixth lens L6 and the image plane IP, the optical filter OF including an infrared filter and a cover glass is provided.

In the embodiments below, the second lens L2 and the sixth lens L6 are manufactured using a plastic material.

Irrotational symmetric lens surfaces used are obtained from well-known Equation 1. Aspherical surfaces are obtained from well-known Equation 2. "E and numbers following E" indicate power of 10. For example, E21 indicates $10^{21}$ and E-02 indicates $10^{-2}$.

$$z = \frac{CUXx^2 + CUYy^2}{1 + SQRT\left\{\begin{matrix}1-(1+KX)CUX^2x^2 - \\ (1+KY)CUY^2y^2\end{matrix}\right\}} + \quad \text{Equation (1)}$$

-continued
$$AR\{(1-AP)x^2 + (1+AP)y^2\}^2 + BR\{(1-BP)x^2 + (1+BP)y^2\}^3 + CR\{(1-CP)x^2 + (1+CP)y^2\}^4 + DR\{(1-DP)x^2 + (1+DP)y^2\}^3$$

z: a length from a definite point on a lens on x and y axes in an optical axis direction;

CUX and CUY: radiuses of curvature in sections of an XZ axis and an XY axis, respectively;

KX and KY: conic constants in the sections of the XZ axis and the XY axis, respectively;

AR, BR, CR, and DR: fourth, sixth, eighth, tenth rotational symmetric coefficients, respectively; and AP, BP, CP, and DP: fourth, sixth, eighth, tenth irrotational symmetric coefficients, respectively.

$$Z = (Y^2/r)[1 + \sqrt{1-(1+K)(Y/r)^2}] + AY^4 + BY^6 + CY^8 + DY^{10} + EY^{10} \quad \text{Equation (2)}$$

Z: a length from a definite point on a lens in an optical axis direction;

Y: a length in a direction vertical to the optical axis;

r: a curvature radius at the definite point on the lens;

K: a conic constant; and

A, B, C, D, and E: aspherical coefficients.

Embodiment 1

Following Table 1 illustrates numerical values according to Embodiment 1.

Figure 2:
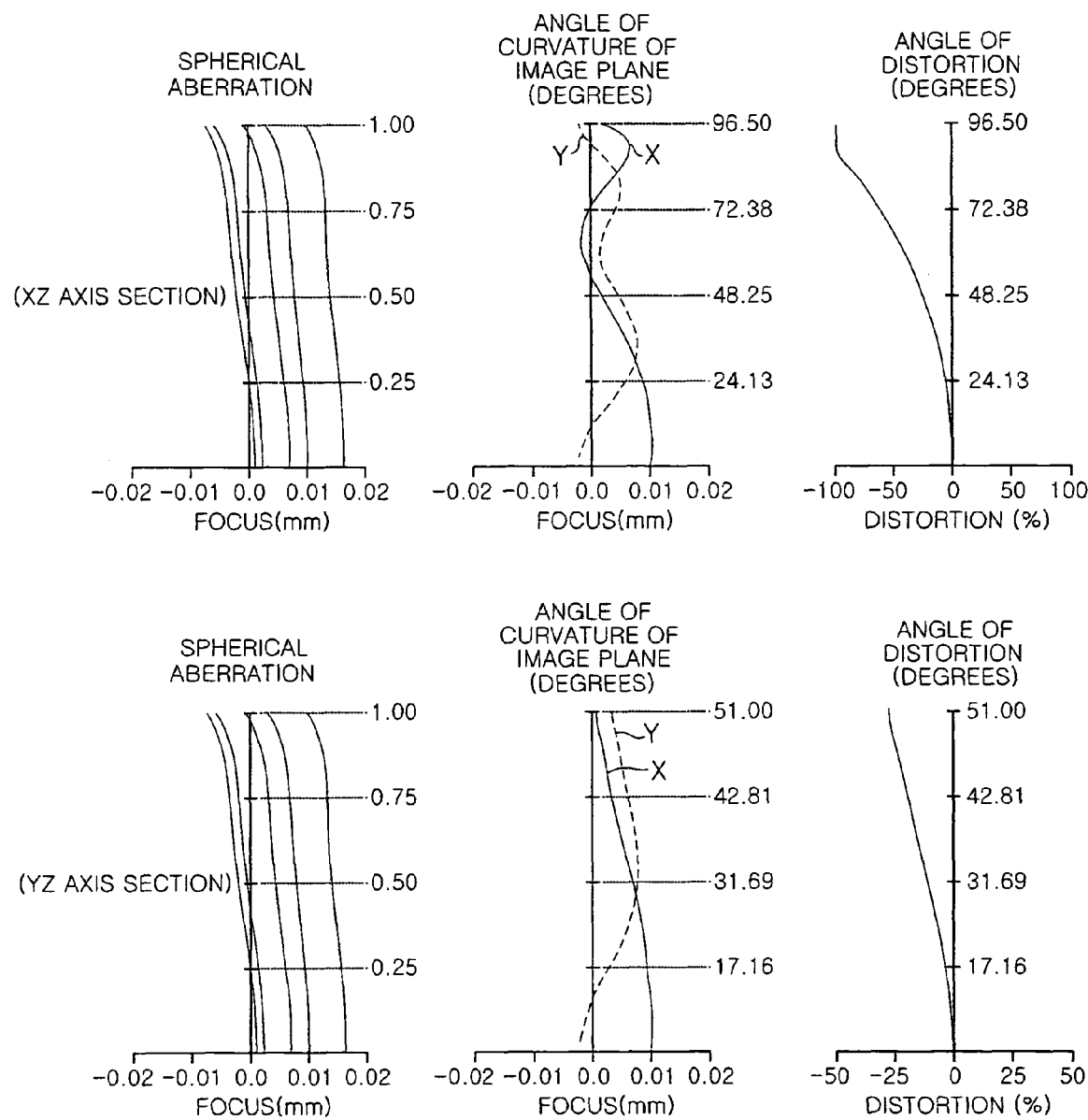
FIG. 2 illustrates various aberrations associated with the optical system of FIG. 1A.

Also, FIG. 1A is a vertical cross-sectional view illustrating a lens configuration of a super wide angle optical system according to an embodiment of the present invention, which is vertically cut from an XZ plane passing through Z-axis in a cubic basic coordinate system, and FIG. 1B is a vertical cross-sectional view illustrating the lens configuration of the super wide angle optical system of FIG. 1A, which is vertically cut from a YZ plane passing through Z-axis in the cubic basic coordinate system. FIG. 2 illustrates various aberrations associated with the optical system of FIG. 1A.

Also, "S" and "T" shown in a following astigmatism diagram indicate sagittal and tangential, respectively.

An effective focal length EFX of a long axis of an entire lens system is 1.184 mm, an effective focal length EFY of the entire lens system is 1.355 mm, an F number $F_{No}$ is 2.0, a long axis viewing angle FOVX is 193 degrees, a short axis viewing angle FOVY is 102 degrees, a total length TL from an aperture stop to an image plane is 15.09763 mm, a focal length f1 of the first lens L1 is −6.865924 mm, a focal length f2 of the second lens L2 is −2.234369 mm, a focal length f3 of the third lens L3 is 4.302594 mm, a focal length f4 of the fourth lens L4 is 2.311528 mm, a focal length f5 of the fifth lens L5 is −2.1713139 mm, and a focal length f6 of the sixth lens L6 is 2.655767 mm.

TABLE 1

| NUMBER OF SURFACES | XZ AXIS CURVATURE RADIUS R(mm) | YZ AXIS CURVATURE RADIUS R(mm) | DISTANCE BETWEEN SURFACES t(mm) | REFRACTIVE INDEX(nd) | ABBE NUMBER (vd) | |
|---|---|---|---|---|---|---|
| 1 | 10.9216 | 10.9216 | 0.6000 | 1.62 | 60.3 | FIRST |
| 2 | 3.0000 | 3.0000 | 3.0469 | | | LENS |
| *3 | −7.45800 | −444.72112 | 0.4996 | 1.531 | 56.0 | SECOND |
| *4 | 1.4442 | 1.4031 | 0.7431 | | | LENS |
| 5 | 3.2493 | 3.2493 | 3.7194 | 1.755 | 27.5 | THIRD |
| 6 | ∞ | ∞ | 0.5613 | | | LENS |

TABLE 1-continued

| NUMBER OF SURFACES | XZ AXIS CURVATURE RADIUS R(mm) | YZ AXIS CURVATURE RADIUS R(mm) | DISTANCE BETWEEN SURFACES t(mm) | REFRACTIVE INDEX(nd) | ABBE NUMBER (vd) | |
|---|---|---|---|---|---|---|
| 7 | ∞ | ∞ | 0.2234 | | | APERTURE STOP |
| 8 | 2.2456 | 2.2456 | 1.1318 | 1.603 | 60.3 | FOURTH LENS |
| 9 | −2.9795 | −2.9795 | 0.1000 | | | |
| *10 | −3.4460 | −3.4460 | 0.8047 | 1.614 | 26.0 | FIFTH LENS |
| *11 | 2.3689 | 2.3689 | 0.2921 | | | |
| *12 | 1.6720 | 1.9088 | 1.2299 | 1.531 | 56.0 | SIXTH LENS |
| *13 | −6.7209 | −5.3786 | 0.4000 | | | |
| 14 | ∞ | ∞ | 0.40000 | 1.517 | 64.2 | OPTICAL FILTER |
| 15 | ∞ | ∞ | 1.34534 | | | |
| IMAGE | ∞ | ∞ | 0.00000 | | | IMAGE PLANE |

In Table 1, * indicates an aspherical surface, conic constants KX and KY and rotational and irrotational symmetric aspherical coefficients AR, BR, CR, DR, AP, BP, CP, and DP according to Equation 1 are as shown in Table 2. A conic constant K and aspherical coefficients A, B, C, and D according to Equation 2 are as shown in Table 3.

TABLE 2

| | NUMBER OF SURFACES | | | |
|---|---|---|---|---|
| | 3 | 4 | 12 | 13 |
| KX | 0 | −0.706 | −4.187 | 0 |
| KY | 0 | −0.7855 | −5.405 | 0 |
| AR | 3.0E−05 | −3.4E−03 | 1.5E−02 | 2.6E−02 |
| BR | −9.9E−05 | −2.2E−03 | −4.9E−03 | −1.6E−03 |
| CR | 3.6E−05 | 3.4E−04 | 9.3E−04 | −9.0E−04 |
| DR | −3.0E−06 | −1.6E−05 | −1.7E−04 | −1.8E−06 |
| AP | 2.7E+00 | −2.4E−02 | 6.0E−02 | −5.6E−02 |
| BP | 1.4E−01 | 7.5E−02 | −7.3E−02 | 8.5E−03 |
| CP | 1.9E−02 | 1.4E−01 | −5.6E−02 | 6.2E−02 |
| DP | −6.8E−02 | −8.9E−02 | 6.6E−02 | 7.2E−01 |

TABLE 3

| | NUMBER OF SURFACES | |
|---|---|---|
| | 10 | 11 |
| K | 1.1058624 | −9.4377635 |
| A | −0.0530297 | −0.0290468 |
| B | 0.02359215 | 0.02575957 |
| C | −0.0040662 | −0.0065877 |
| D | 1.89E−05 | 0.0023533 |

Embodiment 2

Following Table 4 illustrates numerical values according to Embodiment 2.

Figure 3A:
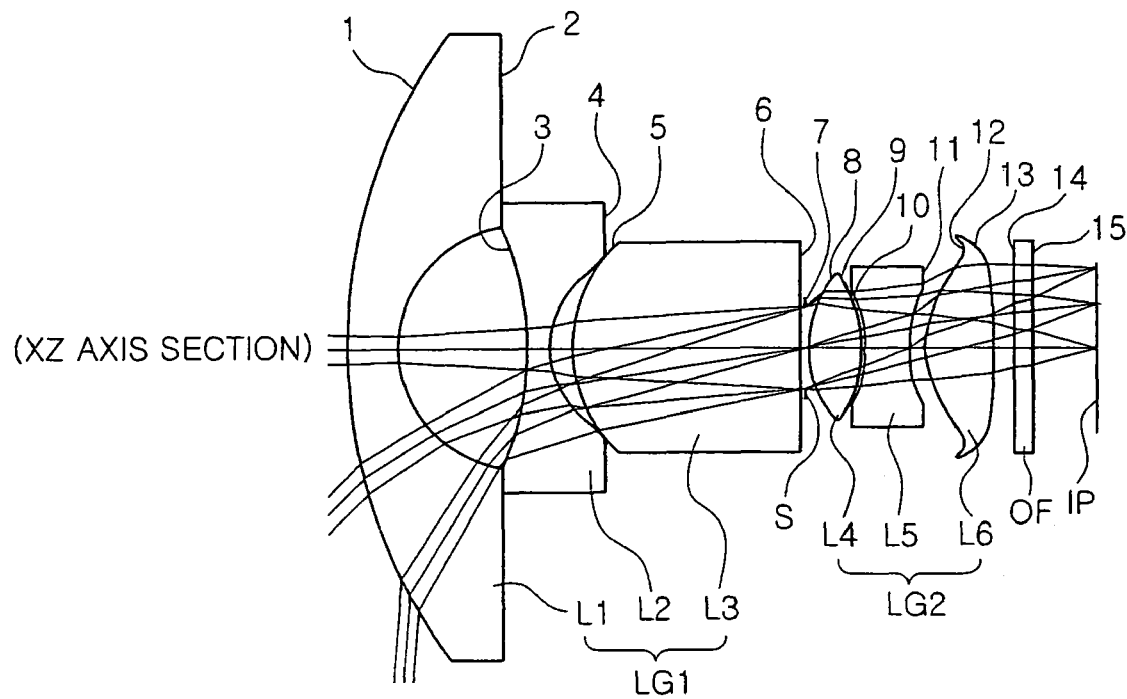
FIG. 3A is a vertical cross-sectional view illustrating a lens configuration of a super wide angle optical system according to another embodiment of the present invention, which is vertically cut from an XZ plane passing through Z-axis in a cubic basic coordinate system.
Figure 3B:
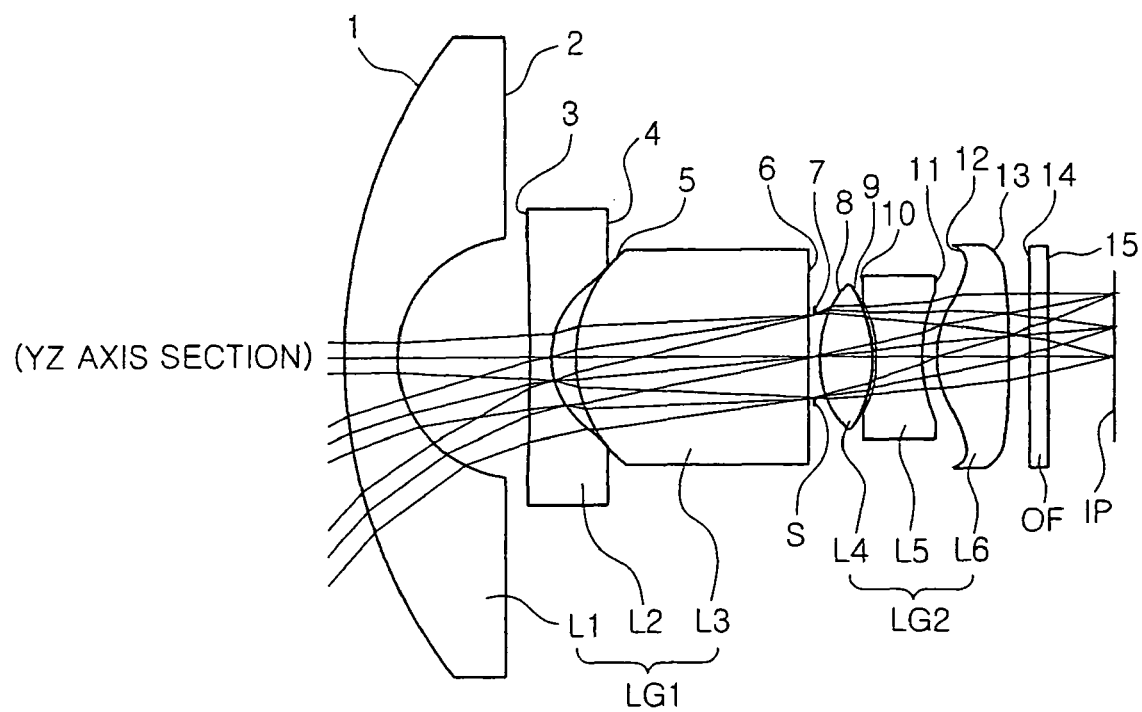
FIG. 3B is a vertical cross-sectional view illustrating the lens configuration of the super wide angle optical system of FIG. 3A, which is vertically cut from a YZ plane passing through Z-axis in the cubic basic coordinate system.
Figure 4:
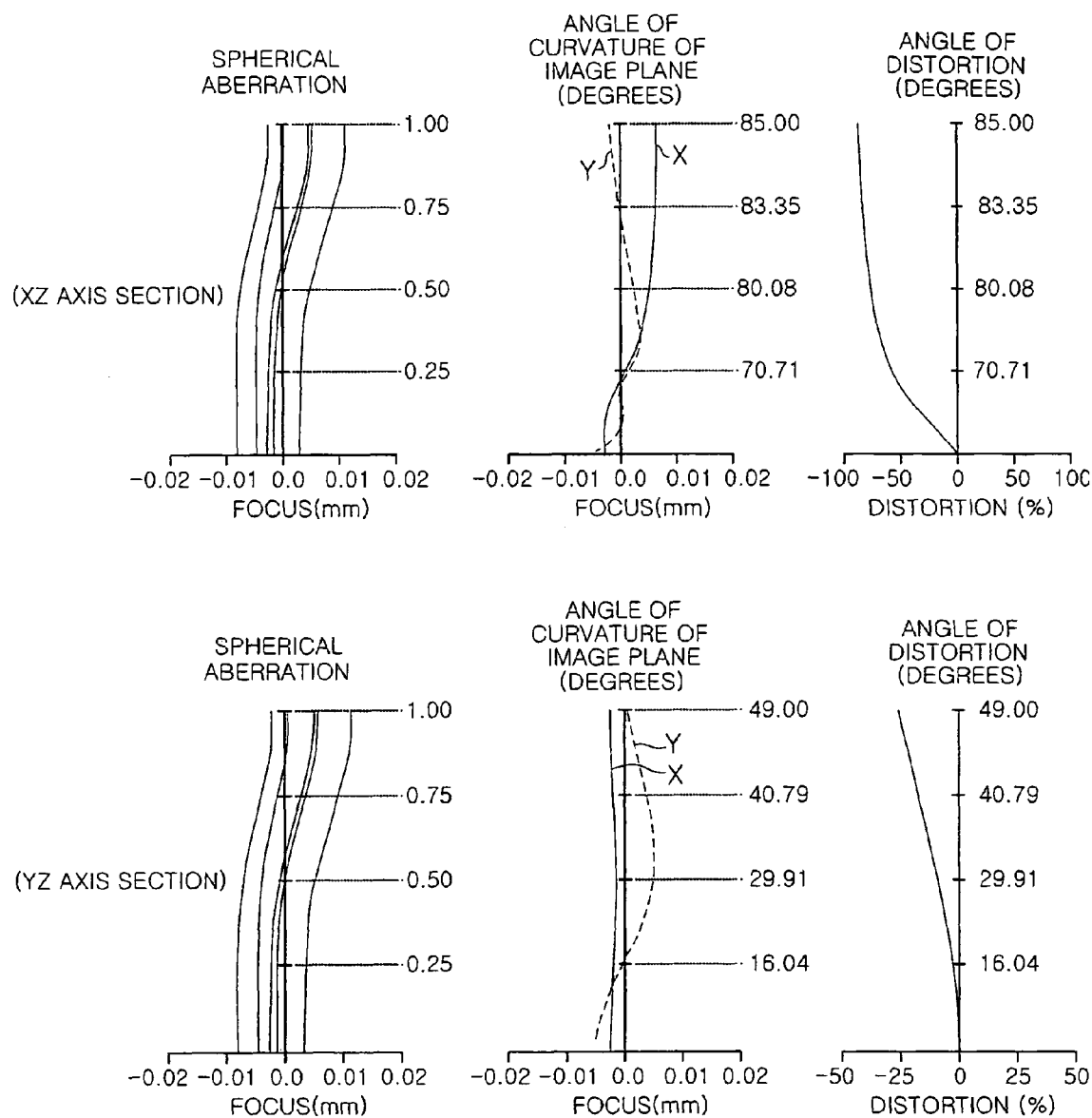
FIG. 4 illustrates various aberrations associated with the optical system of FIG. 3A.

Also, FIG. 3A is a vertical cross-sectional view illustrating a lens configuration of a super wide angle optical system according to an embodiment of the present invention, which is vertically cut from an XZ plane passing through Z-axis in a cubic basic coordinate system, and FIG. 3B is a vertical cross-sectional view illustrating the lens configuration of the super wide angle optical system of FIG. 3A, which is vertically cut from a YZ plane passing through Z-axis in the cubic basic coordinate system. FIG. 4 illustrates various aberrations associated with the optical system of FIG. 3A.

An effective focal length EFX of a long axis of an entire lens system is 1.2006 mm, an effective focal length EFY of the entire lens system is 1.40000 mm, an F number $F_{No}$ is 2.0, a long axis viewing angle FOVX is 190 degrees, a short axis viewing angle FOVY is 98 degrees, a total length TL from an aperture stop to an image plane is 16.01163 mm, a focal length f1 of the first lens L1 is −5.763675 mm, a focal length f2 of the second lens L2 is −2.335535 mm, a focal length f3 of the third lens L3 is 4.322176 mm, a focal length f4 of the fourth lens L4 is 2.352415 mm, a focal length f5 of the fifth lens L5 is −2.233556 mm, and a focal length f6 of the sixth lens L6 is 2.519019 mm.

TABLE 4

| NUMBER OF SURFACES | XZ AXIS CURVATURE RADIUS R(mm) | YZ AXIS CURVATURE RADIUS R(mm) | DISTANCE BETWEEN SURFACES t(mm) | REFRACTIVE INDEX(nd) | ABBE NUMBER (vd) | |
|---|---|---|---|---|---|---|
| 1 | 11.0963 | 11.0963 | 1.1197 | 1.628 | 58.7 | FIRST LENS |
| 2 | 2.6242 | 2.6242 | 2.7035 | | | |
| *3 | −6.56284 | −317.35685 | 0.4500 | 1.531 | 56.0 | SECOND LENS |
| *4 | 1.5661 | 1.5050 | 0.5178 | | | |
| 5 | 3.1763 | 3.1763 | 4.8861 | 1.755 | 27.5 | THIRD LENS |
| 6 | 39.9390 | 39.9390 | 0.1000 | | | |

TABLE 4-continued

| NUMBER OF SURFACES | XZ AXIS CURVATURE RADIUS R(mm) | YZ AXIS CURVATURE RADIUS R(mm) | DISTANCE BETWEEN SURFACES t(mm) | REFRACTIVE INDEX(nd) | ABBE NUMBER (vd) | |
|---|---|---|---|---|---|---|
| 7 | ∞ | ∞ | 0.1000 | | | APERTURE STOP |
| 8 | 2.3362 | 2.3362 | 1.0849 | 1.613 | 60.6 | FOURTH LENS |
| 9 | −3.1065 | −3.1065 | 0.1000 | | | |
| *10 | −3.7850 | −3.7850 | 0.9782 | 1.614 | 26.0 | FIFTH LENS |
| *11 | 2.3196 | 2.3196 | 0.3200 | | | |
| *12 | 1.5692 | 1.7388 | 1.4885 | 1.531 | 56.0 | SIXTH LENS |
| *13 | −6.0940 | −5.4931 | 0.4000 | | | |
| 14 | ∞ | ∞ | 0.40000 | 1.517 | 64.2 | OPTICAL FILTER |
| 15 | ∞ | ∞ | 1.36297 | | | |
| IMAGE | ∞ | ∞ | 0.00000 | | | IMAGE PLANE |

In Table 4, * indicates an aspherical surface, conic constants KX and KY and rotational and irrotational symmetric aspherical coefficients AR, BR, CR, DR, AP, BP, CP, and DP according to Equation 1 are as shown in Table 5. A conic constant K and aspherical coefficients A, B, C, and D according to Equation 2 are as shown in Table 6.

TABLE 5

| | NUMBER OF SURFACES | | | |
|---|---|---|---|---|
| | 3 | 4 | 12 | 13 |
| KX | 0 | −0.707 | −4.2993 | 0 |
| KY | 0 | −0.8599 | −5.3542 | 0 |
| AR | 1.3E−05 | −3.6E−03 | 1.6E−02 | 2.4E−02 |
| BR | −9.5E−05 | −2.4E−03 | −4.6E−03 | −1.2E−03 |
| CR | 3.6E−05 | 4.7E−04 | 9.0E−04 | −6.5E−04 |
| DR | −3.4E−06 | −2.5E−05 | −1.7E−04 | −3.3E−08 |
| AP | 4.5E+00 | 1.6E−01 | 5.2E−02 | −5.4E−02 |
| BP | 2.0E−01 | 4.3E−02 | −2.5E−02 | 8.7E−03 |
| CP | 2.1E−02 | 9.4E−02 | 1.5E−02 | 1.7E−02 |
| DP | −1.3E−01 | −3.2E−02 | 7.9E−03 | 1.4E+00 |

TABLE 6

| | NUMBER OF SURFACES | |
|---|---|---|
| | 10 | 11 |
| K | 1.40239641 | −11.339696 |
| A | −0.0527892 | −0.0334559 |
| B | 0.02161906 | 0.02427752 |
| C | −0.0038412 | −0.0067839 |
| D | −4.24E−05 | 0.00189317 |

Embodiment 3

Following Table 7 illustrates numerical values according to Embodiment 3.

Figure 5A:
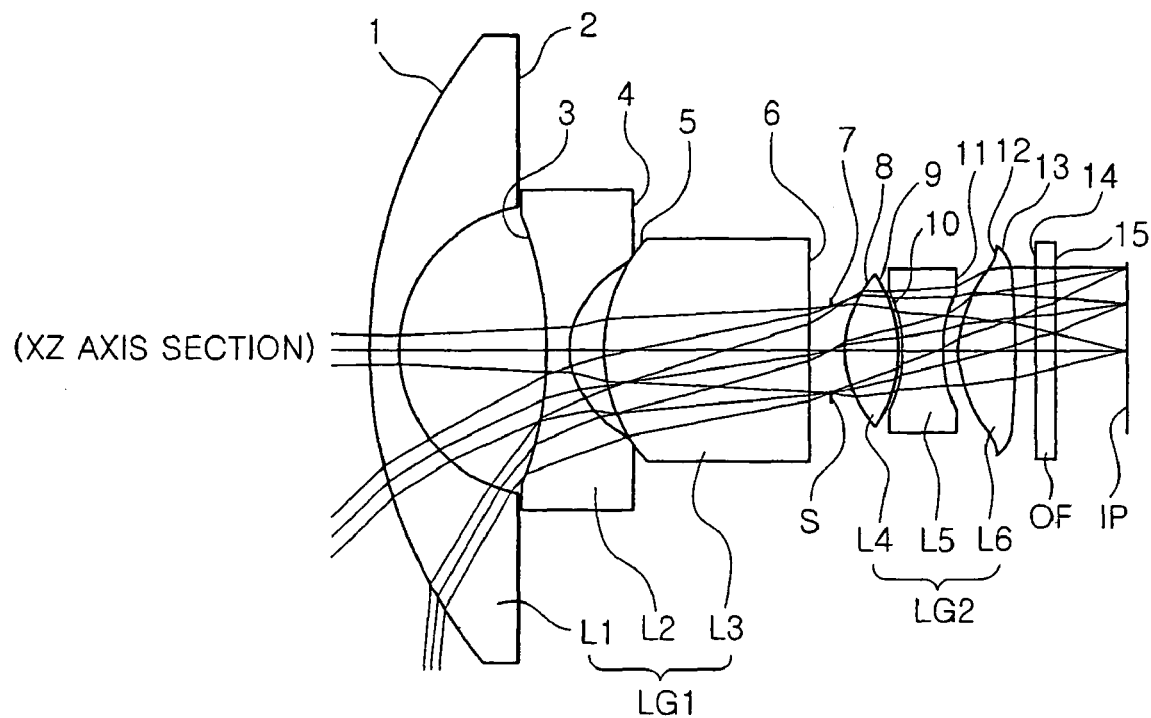
FIG. 5A is a vertical cross-sectional view illustrating a lens configuration of a super wide angle optical system according to still another embodiment of the present invention, which is vertically cut from an XZ plane passing through Z-axis in a cubic basic coordinate system.
Figure 5B:
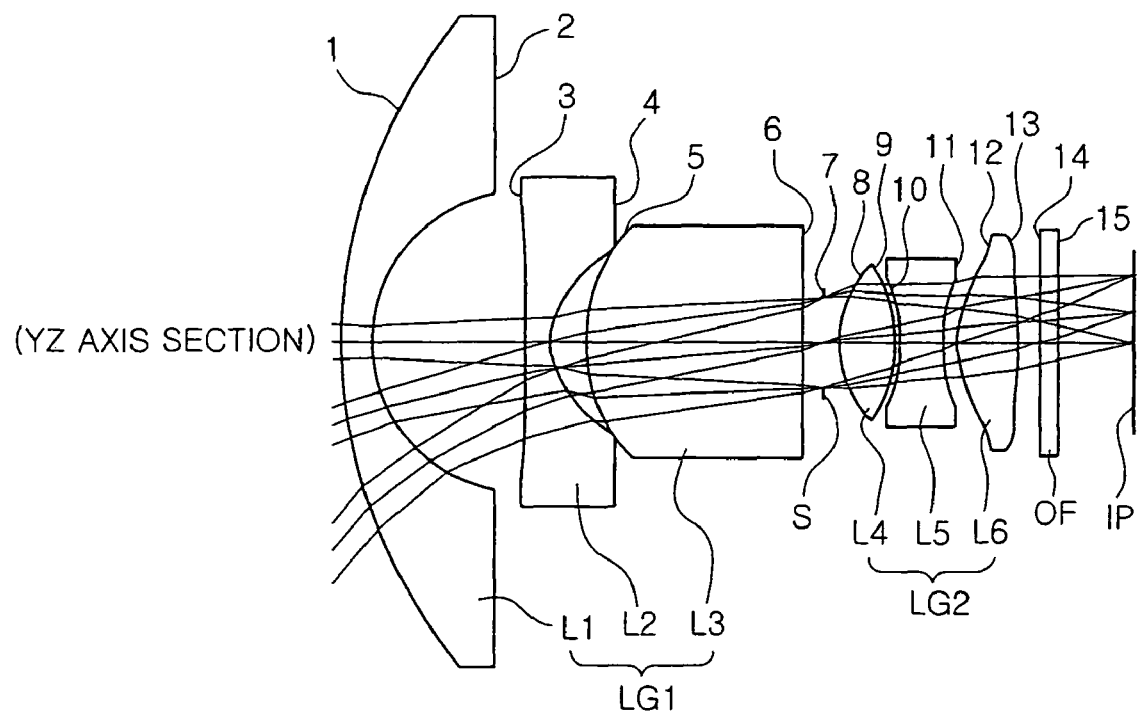
FIG. 5B is a vertical cross-sectional view illustrating the lens configuration of the super wide angle optical system of FIG. 5A, which is vertically cut from a YZ plane passing through Z-axis in the cubic basic coordinate system.
Figure 6:
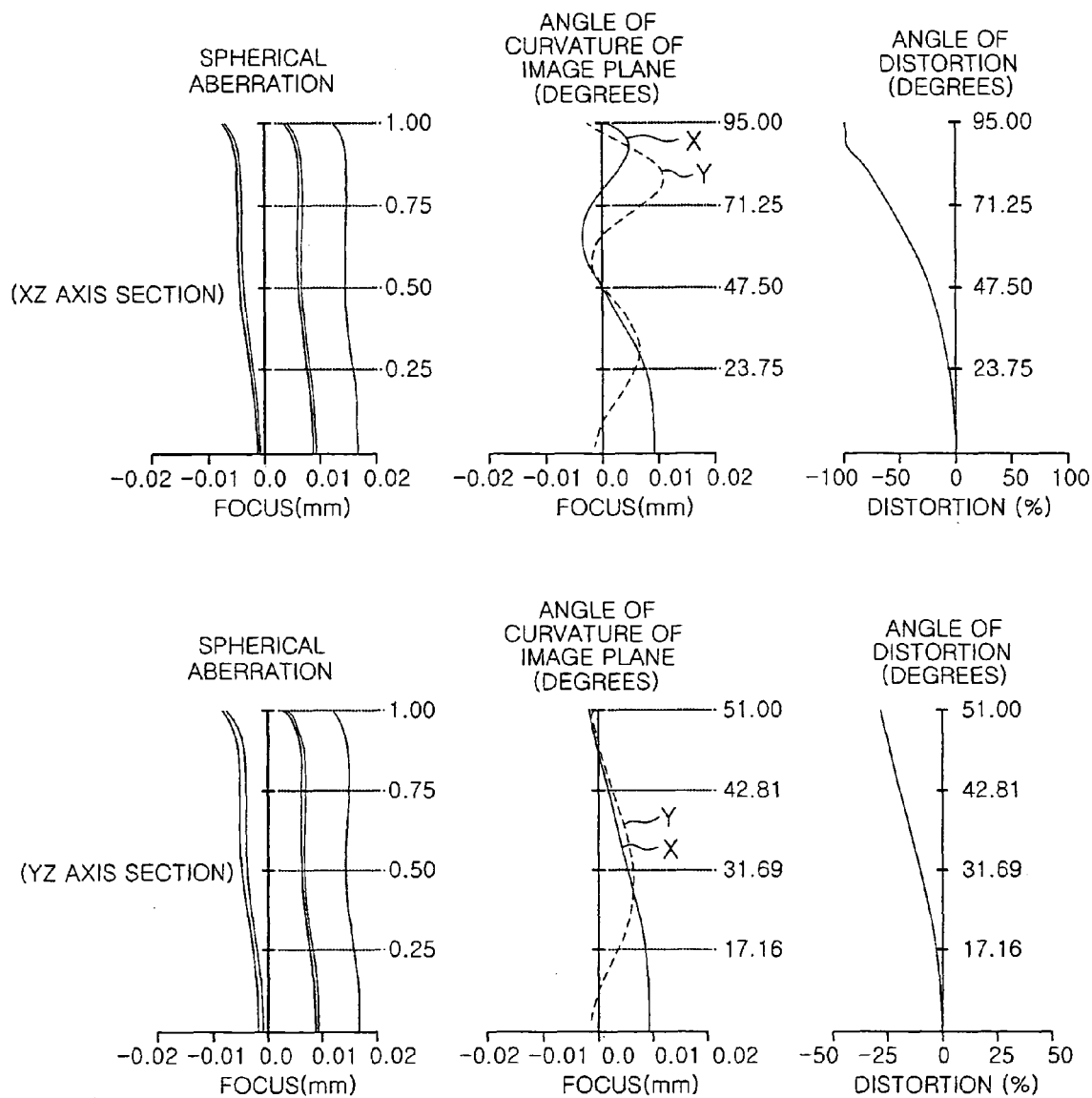
FIG. 6 illustrates various aberrations associated with the optical system of FIG. 5A.

Also, FIG. 5A is a vertical cross-sectional view illustrating a lens configuration of a super wide angle optical system according to an embodiment of the present invention, which is vertically cut from an XZ plane passing through Z-axis in a cubic basic coordinate system, and FIG. 5B is a vertical cross-sectional view illustrating the lens configuration of the super wide angle optical system of FIG. 5A, which is vertically cut from a YZ plane passing through Z-axis in the cubic basic coordinate system. FIG. 6 illustrates various aberrations associated with the optical system of FIG. 5A.

An effective focal length EFX of a long axis of an entire lens system is 1.2 mm, an effective focal length EFY of the entire lens system is 1.35300 mm, an F number $F_{No}$ is 2.0, a long axis viewing angle FOVX is 190 degrees, a short axis viewing angle FOVY is 102 degrees, a total length TL from an aperture stop to an image plane is 15.29850 mm, a focal length f1 of the first lens L1 is −7.073965 mm, a focal length f2 of the second lens L2 is −2.291838 mm, a focal length f3 of the third lens L3 is 4.450255 mm, a focal length f4 of the fourth lens L4 is 2.302125 mm, a focal length f5 of the fifth lens L5 is −2.17453 mm, and a focal length f6 of the sixth lens L6 is 2.662062 mm.

TABLE 7

| NUMBER OF SURFACES | XZ AXIS CURVATURE RADIUS R(mm) | YZ AXIS CURVATURE RADIUS R(mm) | DISTANCE BETWEEN SURFACES t(mm) | REFRACTIVE INDEX(nd) | ABBE NUMBER (vd) | |
|---|---|---|---|---|---|---|
| 1 | 10.2067 | 10.2067 | 0.6000 | 1.62 | 60.3 | FIRST LENS |
| 2 | 3.0000 | 3.0000 | 2.9331 | | | |
| *3 | −7.68080 | −74.92904 | 0.4747 | 1.531 | 56.0 | SECOND LENS |
| *4 | 1.4776 | 1.4388 | 0.7000 | | | |
| 5 | 3.3437 | 3.3437 | 4.1790 | 1.755 | 27.5 | THIRD LENS |
| 6 | 303.5694 | 303.5694 | 0.4361 | | | |

TABLE 7-continued

| NUMBER OF SURFACES | XZ AXIS CURVATURE RADIUS R(mm) | YZ AXIS CURVATURE RADIUS R(mm) | DISTANCE BETWEEN SURFACES t(mm) | REFRACTIVE INDEX(nd) | ABBE NUMBER (vd) | |
|---|---|---|---|---|---|---|
| 7 | ∞ | ∞ | 0.2930 | | | APERTURE STOP |
| 8 | 2.2704 | 2.2704 | 1.0787 | 1.603 | 60.3 | FOURTH LENS |
| 9 | −2.9353 | −2.9353 | 0.1000 | | | |
| *10 | −3.4373 | −3.4373 | 0.8050 | 1.614 | 26.0 | FIFTH LENS |
| *11 | 2.3333 | 2.3333 | 0.2954 | | | |
| *12 | 1.6625 | 1.8519 | 1.1769 | 1.531 | 56.0 | SIXTH LENS |
| *13 | −7.1357 | −5.8644 | 0.4000 | | | |
| 14 | ∞ | ∞ | 0.40000 | 1.517 | 64.2 | OPTICAL FILTER |
| 15 | ∞ | ∞ | 1.42657 | | | |
| IMAGE | ∞ | ∞ | 0.00000 | | | IMAGE PLANE |

In Table 7, * indicates an aspherical surface, conic constants KX and KY and rotational and irrotational symmetric aspherical coefficients AR, BR, CR, DR, AP, BP, CP, and DP according to Equation 1 are as shown in Table 8. A conic constant K and aspherical coefficients A, B, C, and D according to Equation 2 are as shown in Table 9.

TABLE 8

| | NUMBER OF SURFACES | | | |
|---|---|---|---|---|
| | 3 | 4 | 12 | 13 |
| KX | 0 | −0.7124 | −4.1319 | 0 |
| KY | 0 | −0.7837 | −5.0728 | 0 |
| AR | 8.7E−06 | −2.8E−03 | 1.6E−02 | 2.7E−02 |
| BR | −1.0E−04 | −2.1E−03 | −4.6E−03 | −1.6E−03 |
| CR | 3.7E−05 | 3.8E−04 | 9.6E−04 | −7.7E−04 |
| DR | −3.3E−06 | −3.2E−05 | −1.6E−04 | −4.8E−08 |
| AP | 4.2E+00 | 7.7E−03 | 7.0E−02 | −2.3E−02 |
| BP | 1.6E−01 | 8.3E−02 | −4.3E−02 | 3.6E−02 |
| CP | 2.5E−02 | 1.0E−01 | −1.8E−02 | 3.9E−02 |
| DP | −8.7E−02 | −9.6E−02 | 3.9E−02 | 1.8E+00 |

TABLE 9

| | NUMBER OF SURFACES | |
|---|---|---|
| | 10 | 11 |
| K | 1.2404252 | −9.3989282 |
| A | −0.0526292 | −0.029962 |
| B | 0.02343858 | 0.02530973 |
| C | −0.0038993 | −0.0066649 |
| D | −3.77E−05 | 0.00227975 |

Values of Conditional Expressions 1 to 5 with respect to Embodiments 1 to 3 are as shown in Table 10

TABLE 10

| | EMBODIMENT 1 | EMBODIMENT 2 | EMBODIMENT 3 |
|---|---|---|---|
| CONDITIONAL EXPRESSION 1 | 1.892157 | 1.93877551 | 1.8627451 |
| CONDITIONAL EXPRESSION 2 | 1.144426 | 1.166084 | 1.1275 |
| CONDITIONAL EXPRESSION 3 | 9.224304 | 9.242277 | 8.505571 |
| CONDITIONAL EXPRESSION 4 | 4.482025 | 4.828417 | 4.613368 |
| CONDITIONAL EXPRESSION 5 | 7.548817 | 8.005817 | 7.649252 |

As shown in Table 10, Embodiments 1 to 3 of the present invention satisfy Conditional Expressions 1 to 5. Also, Embodiments 1 to 3 embody a lens system with excellent properties of various aberration as shown in FIGS. 2, 4, and 6.

While the present invention has been shown and described in connection with the exemplary embodiments, it will be apparent to those skilled in the art that modifications and variations can be made without departing from the spirit and scope of the invention as defined by the appended claims.

What is claimed is:

1. A super wide angle optical system comprising sequentially from an object side:
a first lens group comprising one or more of irrotational symmetric lens surfaces having, overall, a negative refractive power, wherein the first lens group comprises, in order from the object side
a first lens including an object-side surface convex to the object side and an image-side surface concave to an image side and having a negative refractive power,
a second lens including an object-side surface and an image-side surface formed of irrotational symmetric lens surfaces and having a negative refractive power, and
a third lens including an object-side surface convex to the object side and having a positive refractive power;
an aperture stop to intercept unnecessary light; and
a second lens group comprising one or more of irrotational symmetric lens surfaces and having, overall, a positive refractive power, in order from the object side, wherein the second lens group comprises, in order from the object side
a fourth lens including an object-side surface convex to the object-side and an image-side surface convex to the image side and having a positive refractive power, a fifth lens including an object-side surface concave to the image side and an image-side surface concave to the object side and having a negative refractive power, and a sixth lens including an object-side surface and an image-side surface formed of irrotational symmetric lens surfaces and having a positive refractive power.

2. The optical system of claim 1, wherein two or more lenses of the first and second lens groups comprise one or more of surfaces formed of an aspheric plastic material.

3. The optical system of claim 1, wherein the first lens group and the second lens group are provided where a viewing angle between a long axis and an image plane is 130 degree or more.

4. The optical system of claim 1, wherein following Conditional expression 1 is satisfied;

$$1.5 < FOVX/FOVY < 2.0 \quad \text{Conditional expression (1)}$$

in which FOVX indicates a viewing angle of a long axis and FOVY indicates a viewing angle of a short axis.

5. The optical system of claim 1, wherein following Conditional expression 2 is satisfied;

$$1.0 < EFY/EFX < 1.5 \quad \text{Conditional expression (2)}$$

in which EFY indicates an effective focal length of the short axis and EFX indicates an effective focal length of the long axis.

6. The optical system of claim 1, wherein following Conditional expression 3 is satisfied;

$$7.0 < r1/EFX < 11.0 \quad \text{Conditional expression (3)}$$

in which r1 indicates a curvature radius of the object-side surface of the first lens and EFX indicates an effective focal length of the long axis.

7. The optical system of claim 1, wherein following Conditional expression 4 is satisfied;

$$-4.2 < L/2w < 5.5 \quad \text{Conditional expression (4)}$$

in which L indicates a length from a definite point on the object-side surface of the first lens to the image plane and 2W indicates the viewing angle of the long axis in radians.

8. The optical system of claim 1, wherein following Conditional expression 5 is satisfied;

$$-7.5 < L/Fno < 8.5 \quad \text{Conditional expression (5)}$$

in which L indicates a length from a definite point on the object-side surface of the first lens to the image plane and Fno indicates an F-number of the optical system.

* * * * *